Figure 5:
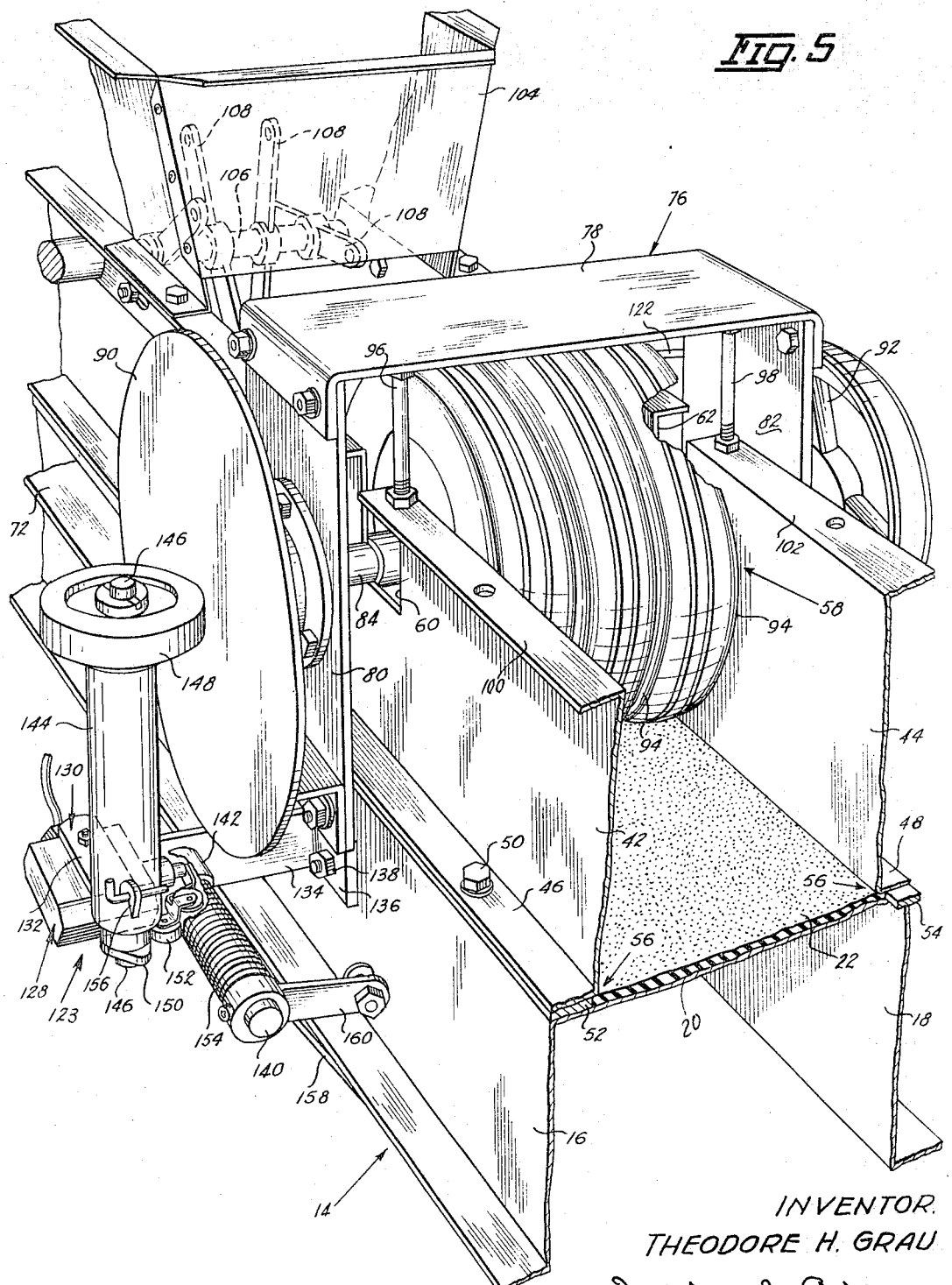

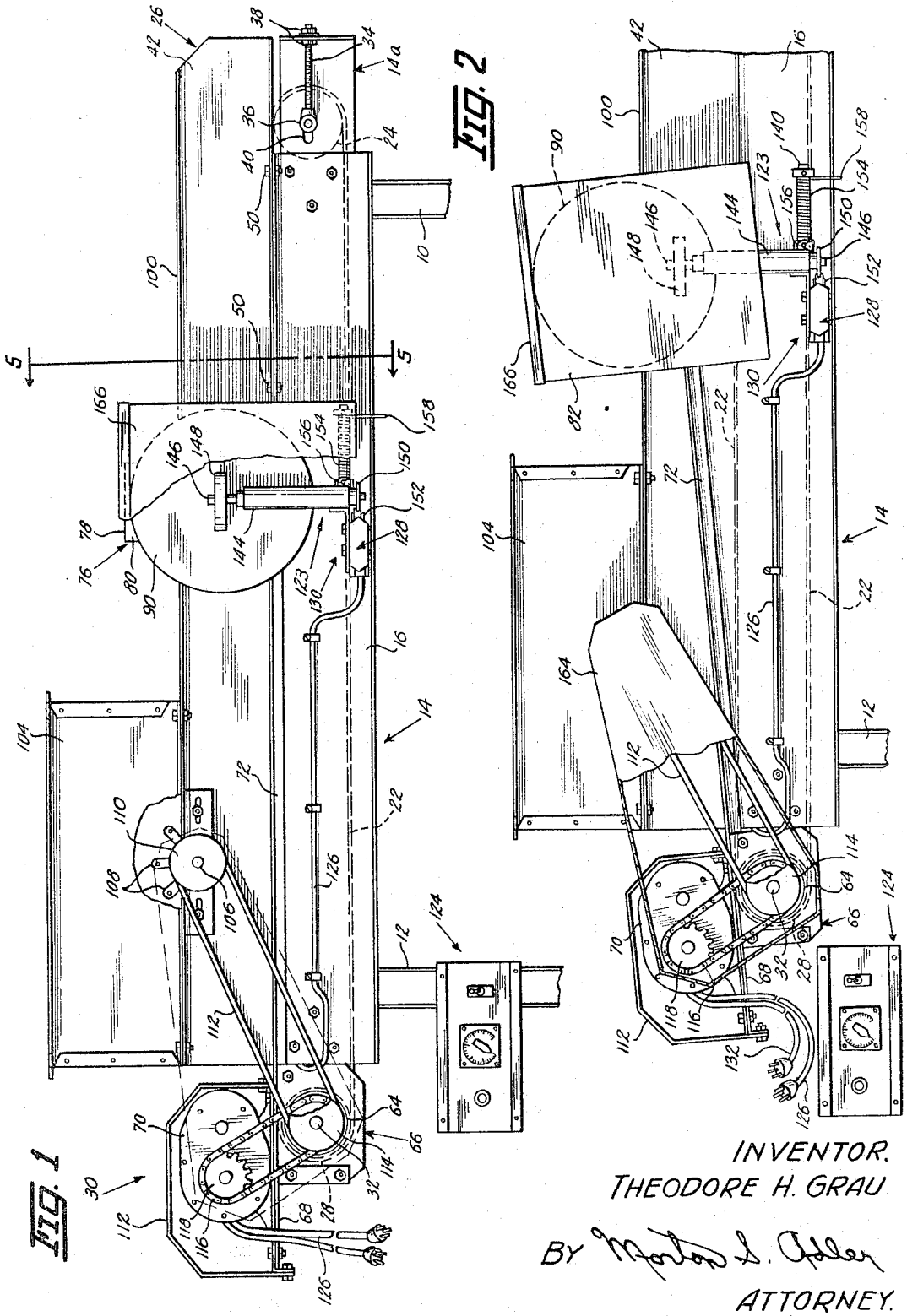

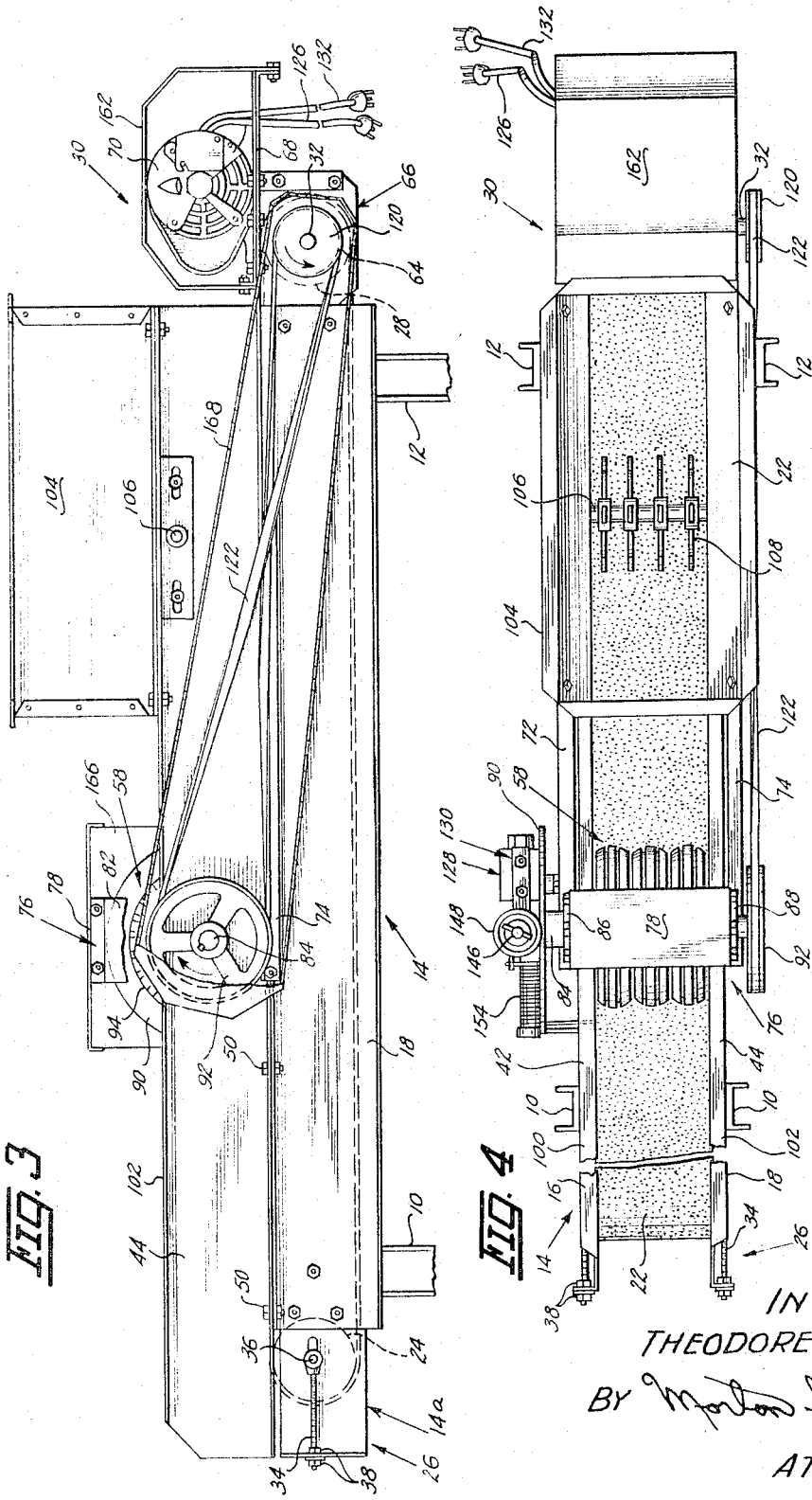

Jan. 24, 1967  T. H. GRAU  3,300,024
METERING DEVICE

Filed April 9, 1964  3 Sheets-Sheet 3

INVENTOR.
THEODORE H. GRAU
BY Morton S. Adler
ATTORNEY.

United States Patent Office 3,300,024
Patented Jan. 24, 1967

3,300,024
METERING DEVICE
Theodore H. Grau, Rembrandt, Iowa
(2104 24th St., Columbus, Nebr. 68601)
Filed Apr. 9, 1964, Ser. No. 358,507
9 Claims. (Cl. 198—39)

This invention relates to a volumetric metering device for free flowing materials and has been designed particularly for measuring silage, dry chopped hay, grains and the like.

It is an object of this invention to provide an improved and more efficient metering device of the class that moves material on a conveyor in relation to apparatus that is responsive to the thickness of the material passing a selected point. In this regard, many present devices employ the principle of opening and closing an intake gate or passageway through which the material passes by means of a lever connection to a feeler element responsive to the thickness of material passing between the conveyor and feeler. In my invention, I have utilized the feeler element principle but have simplified the related structure and provided a more efficient, economical and accurate machine.

According to the present invention, a commercially available counting device is actuated in relation to a feeler drum so that after a predetermined volume of material has passed the drum, the conveyor operation is automatically terminated.

More particularly, it is an object of this invention to provide a metering device of the above class which includes a novel control means associated with the feeler drum that increases or decreases the speed of operation of the counter automatically in relation to the volume of material moving on the conveyor.

A further object herein is to provide a metering device as characterized which includes means to evenly distribute the material on the conveyor so as to maintain it at a uniform thickness past the feeler drum.

To attain, these objects and such further objects as may appear herein, or be hereinafter pointed out, reference is made to the accompanying drawings forming a part hereof, in which:

FIG. 1 is a side elevational view of this invention with shield portions broken away to better illustrate the construction thereof and showing the control wheel on the feeler drum in its lower position, FIG. 2 is a view similar to FIG. 1 but showing the control wheel in an elevated position, FIG. 3 is a side elevational view of the opposite side shown in FIG. 1, FIG. 4 is a top plan view of this machine, and FIG. 5 is an enlarged perspective view taken from the line 5—5 of FIG. 1.

Referring to the drawings, a pair of spaced ground engaging support legs 10 and 12 carry an elongated frame 14 which includes the respective spaced sides 16 and 18 and top 20. Top 20 serves as the platform for movement of the endless conveyor belt 22 which is trained over the idler roller 24 mounted to a frame extension 14a at end 26 of frame 14 and over a drive roller means 28 at end 30 of frame 14. Belt 22 preferably is of a rubberized acid resistant and waterproof material with a rough surface for gripping material and for reducing the possibility of plugging. Roller 28 is mounted to the bearing journalled shaft 32 that is supported by frame 14 in any suitable manner. Belt tightening rods 34 extend between shaft 36 for roller 24 and the outer end of frame extension 14a and includes the double lock nuts 38. Shaft 36 is movable in the slots 40 provided in the opposing sides of frame extension 14a as best seen in FIG. 1.

A super or upper frame is carried by frame 14 in the form of vertical extensions of sides 16 and 18 and such frame extensions are designated by the numerals 42 and 44 as seen in FIG. 5. Both frame members 42 and 44 are channel shaped in cross-section with their channel sides disposed in opposite directions relative to each other. The lower channel sides 46 and 48 of the respective frames 42 and 44 are bolted as at 50 to the opposite longitudinal edges of frame top 20, and as seen in FIG. 5, spacer bars 52 and 54 are placed intermediate frame portions 46 and 48 and top 20 in order to raise the upper frame 42 and 44 sufficiently to allow belt 22 to run partially under frame portions 46 and 48 as indicated at 56. The purpose for this is related to the gauge wheel assembly 58 which will later be referred to in detail. Also related to assembly 58 as will later appear is the opposed notches 60 and 62 in the respective upper frame members 42 and 44.

A bearing 64 on shaft 32 rotatably supports a motor mount frame 66 and frame 66 includes a platform 68 on which the electric motor 70 is attached. Secured to mount 66 are the elongated spaced parallel arms 72 and 74 that extend in the direction of end 26 of frame 14 and straddle the upper frame members 42 and 44. The extended ends of arms 72 and 74 are connected by a yoke member 76 which includes the top 78 and sides 80 and 82 and which is disposed over notches 60 and 62 as seen in FIG. 5. A shaft 84 extends transversely of frame members 42 and 44 through notches 60 and 62 and through the respective bearings 86 and 88 in yoke sides 80 and 82. Shaft 84, outside of yoke side 80 carries the flat disk plate or wheel 90, and outside of yoke side 82 it carries the pulley wheel 92. On shaft 84 intermediate frame members 42 and 44 is the gauge wheel assembly 58 which I have shown as a plurality of like sized tired wheels 94 and which fit squarely between frames 42 and 44 by reason of the conveyor arrangement at 56 as previously mentioned. It is pointed out that assembly 58 may be in the form of a single roller or drum, as that is the effect of wheels, but I preferably use the individual wheels 94 because they are readily available and if this machine is made smaller or larger as may be desired at times, the number of wheels 94 can be easily increased or decreased whereas drums or rollers would have to be replaced. Thus far described, it will be seen that wheels 94 together with yoke 76 and arms 72 and 74 will rise or fall in response to the thickness of material moving on conveyor 22 since arms 72 and 74 are secured to the pivotally arranged mount 66. Adjustment of wheels 94 to belt 22 is accomplished by the upstanding rods 96 and 98 that are secured to the upper channel flanges 100 and 102 of frames 42 and 44 and serve as stops to limit the downward position of yoke 76. The height of rods 96 and 98 can be selectively adjusted as is apparent.

A hopper member 104 is removably mounted across frame members 42 and 44 near mount 66, and transversely of members 42 and 44 so as to be within hopper 104 is the agitator shaft 106 on which there are a plurality of spaced radially extending randomly arranged fingers 108 for evenly distributing matter passing through the hopper onto belt 22. Shaft 106 carries a pulley 110 which connects by belt drive 112 to pulley 114 on shaft 32 and shaft 32 is also suitably connected by the chain drive 116 to a sprocket 118 of motor 70 as seen in FIG. 1. The opposite end of shaft 32 (FIG. 3) carries the pulley 120 which connects by the crossed belt 122 to pulley 92. The size of pulleys in this drive train may of course be varied to increase or decrease the conveyor speed but the gauge wheels 94 should rotate at the same speed as the conveyor. In the machine shown, the wheels 94 are of eight inch diameter and the roller in assembly 28 is of four inch diameter. Correspondingly, pulleys 120 and 92 are three and six inch diameters respectively.

Reference is now made more particularly to FIGS. 1, 2 and 5 which show the novel counter control assembly 123 that is one of the important features of this invention. Assembly 123, as will appear, is a variable speed control means for a solenoid operated counter mechanism 124 (FIG. 1) that is commercially available. Counter 124 is of a type that can be preset to a selected numbered dial reading and as the counter is actuated, it counts back to zero at which point it will act upon an electric contact in a well-known manner. In the present invention, counter 124 is placed in the circuit to motor 70 by connection with line 126, and line 126 also includes a microswitch 128 mounted to a bracket assembly 130 on side 16 of frame 14 below wheel 90 as shown. The other line 132 is adapted to connect to a source of electricity. Bracket assembly 130 includes the horizontal arm 134 perpendicularly disposed relative to frame side 16 below wheel 90 and has a T-shaped end 136 which abuts frame 16 and is secured thereto as by bolts 138. The holes (not shown) in frame 16 through which bolts 138 passed are actually small vertical slots to permit of a limited vertical adjustment of assembly 130 as will later appear.

Arm 134 carries a short shaft 140 extending in spaced parallel relationship to frame side 16, and a collar 142 rotatably journalled on shaft 140 is secured to the upstanding cylindrical housing 144. Rotatably journalled in housing 144 in suitable bearings (not shown) is the shaft 146 which carries the drive wheel 148 at the top, preferably of hard rubber, and the cam member 150 at the bottom for rotation therewith. Cam 150 is disposed to intermittently actuate a contact element 152 on switch 128 as shaft 146 rotates and such rotation is effected by contact of wheel 148 with wheel 90. As best seen in FIG. 5, the respective planes of wheels 148 and 90 are perpendicular to each other so that the flat face of wheel 90 is engaged by the peripheral edge of wheel 148 and to maintain wheel 148 in contact with wheel 90 a spring means 154 is placed on shaft 140. Spring means 154 is of a well-known type being at one end engaged with an apertured ear 156 on housing 144 and at its other end having a projecting length 158 for abutment against frame side 16. Tension on spring 154 is maintained by the adjustable fitting 160 to normally urge wheel 148 into contact with wheel 90. Thus far described it is pointed out that with the gauge wheel assembly 58 adjusted relative to the conveyor 22 as above indicated, wheel 148 will be adjusted, if necessary, by bracket assembly 130 so that its contact with wheel 90 is exactly at the axis thereof when no material is passing over the conveyor and the gauge wheel assembly 58 is at its lower position.

Protective covers or hoods are provided on this machine in a well-known manner and include the cover 162 for the motor mount 66, cover 164 (FIG. 2) for the drive train to the agitator shaft 106 and the conveyor belt 22, the cover 166 for assembly 123, and cover 168 for the belt 122.

*Operation*

Material to be measured volumetrically will be delivered to hopper 104 by any suitable means where it will be evenly distributed across belt 22 by the agitator fingers 108 so as to assure a uniform thickness of such material as it passes under the gauge wheels 94 or drum if a drum is used in place of such wheels. Rotation of the gauge wheels and belt 22 is powered from motor 70 as described so that both move at the same speed, and as the material reaches the gauge wheels, such wheels tend to ride or climb over such material and are elevated according to the thickness of the material. This in turn elevates wheel 90 which is secured to the gauge wheel shaft 84 and rotating therewith. As soon as the contact point between wheel 148 and wheel 90 is eccentric, wheel 148 will be rotated and it will thus be seen that the higher wheel 90 moves, the faster wheel 148 will be rotated since the speed of wheel 148 will increase as its relative position to the axis of wheel 90 is increased. Accordingly, as wheel 148 rotates, cam 150 will act on switch 128 which in turn acts on counter 124.

Counter 124 as stated above is a commercially available apparatus which has not been shown in detail as the construction thereof forms no part of this invention but since it has been incorporated with my control assembly 123, its general operation will be explained for purposes of clarity. Counter 124 will include electrical connection to the circuitry for motor 70 or, if desired, to any motor mechanism (not shown) which is used to move material into hopper 104, and for opening such circuit at a preselected time. A counting mechanism is preset for a given number of actuations and as such actuations occur, counter 124 progresses toward a zero setting at which point the circuit to motor 70, or otherwise as indicated, is opened in a well-known manner. With the present invention, switch 128, as it is intermittently actuated by cam 150, acts intermittently on a solenoid actuated ratchet which is a part of counter 124 and which returns the preset counting mechanism to its zero setting. It will thus be understood that the greater the thickness of material moving past wheels 94, the faster cam 150 will turn and the quicker counter 124 will reach its zero setting. Thus, the length of time in which belt 22 is moving material is controlled by the volume of material being moved as either belt 22 will be stopped or the source of supply to hopper 104 will cease when the desired amount of material has been measured.

A calibration for counter 124 in relation to material being measured can be easily determined as follows. With preset counter number of 50, for example, material can be moved on belt 22 until the zero counter setting is reached at which point the material is weighed. Assuming 400 pounds of weight, it is apparent that each count, or each rotation of cam 150 against switch 128 represents eight pounds of material so any desired measurement can be calibrated accordingly.

From the foregoing it is thought a full understanding of the construction and operation of this invention will be had and the advantages of the same will be appreciated.

It will be understood that the phraseology employed herein is for the purpose of description and not for limitation and that modifications and changes in the construction and arrangement of this invention can be made within the scope of what is claimed, without departing from the spirit and purpose thereof. It is thus intended to cover by the claims, any modified forms of structure or mechanical equivalents which may be reasonably included within their scope.

1. In a metering device for silage, grain and the like, the combination of:
   an elongated frame,
   a horizontal belt conveyor carried by said frame,
   an electric motor for running said conveyor,
   an electric counter of the type being selectively settable from a zero setting for a fixed number of actuations back to said zero position at which point it is adapted to act on any desired switch means,
   said counter being operatively connected to said motor for deactuating the same at said zero setting,
   a microswitch electrically connected to said counter,
   a shaft disposed transversely of said conveyor belt,
   a gauge wheel on said shaft,
   means supporting said shaft to permit vertical movement thereof in relation to the thickness of material moving on said conveyor belt beneath said gauge wheel,
   said motor operatively connected to said shaft for rotating said gauge wheel when said conveyor belt is running
   a disk wheel on one end of said shaft for rotation therewith, a second shaft, means on said frame rotatably supporting said second shaft in a vertical plane adjacent said disk wheel, a cam on the lower end of said second shaft disposed to intermittently act upon said microswitch, a drive wheel on the upper end of said second shaft in peripheral engagement with the face of said disk wheel, and the vertical movement of said disk wheel with said shaft effecting a change of the contact point of said drive wheel on said disk wheel on a radial line from the axis of said disk wheel toward the perimeter thereof whereby the greater the thickness of material moving on said conveyor, the higher said gauge wheel and disk wheel is moved and the closer to the perimeter of said disk wheel is the contact with said drive wheel so said cam acts on said microswitch progressively faster to correspondingly speed the return of said counter to zero position.

2. In a metering device for silage, grain and the like, the combination of:

a frame, an electrically operated conveyor belt on said frame, an electric circuit including a motor for running said belt, a counter device for deactuating said motor after a predetermined number of actuations and a microswitch for intermittently actuating said counter, a shaft disposed transversely of said conveyor belt and operatively connected to said motor, a gauge wheel on said shaft, means supporting said shaft to permit vertical movement thereof in relation to the thickness of material moving on said conveyor belt beneath said gauge wheel, a disk wheel on one end of said shaft for rotation therewith, a vertical shaft having a cam on its lower end and a drive wheel on its upper end, means on said frame rotatably supporting said vertical shaft so said cam can intermittently act on said microswitch and said drive wheel is in peripheral engagement with the face of said disk wheel, said drive wheel contacting the axis of said disk wheel when no material is moving on said conveyor belt so that said drive wheel is inoperative, and as the vertical position of said gauge wheel varies with the thickness of material moving on said conveyor belt, the contact point on said disk wheel with said drive wheel becomes progressively radially spaced from the axis thereof to progressively increase the speed of rotation of said drive wheel and cam and to correspondingly increase the actuations of said counter.

3. A device as defined in claim 2 wherein the supporting means for said vertical shaft is spring loaded to normally urge said drive wheel into contact with said disk wheel.

4. A device as defined in claim 2 including adjustment means for orienting the drive wheel for a zero setting defined by registration with the axis of said disk wheel when no material is moving on said conveyor belt.

5. A device as defined in claim 2 including means to selectively adjust said gauge wheel in proximity to said conveyor belt.

6. A device as defined in claim 2 including:

a hopper on said frame for receiving and directing material to said conveyor belt, and agitator means in said hopper to evenly distribute said material onto said conveyor belt.

7. In a metering device for silage, grain and the like, the combination of:

a frame, an electrically operated conveyor belt on said frame, an electric circuit including a motor for running said belt, and a counter device for deactuating said motor after a predetermined number of actuations, a gauge means extending transversely of said conveyor belt, said gauge means including a disk wheel rotatable by said motor, a rotatable cam engageable with said counter device to intermittently actuate the same, a drive wheel in peripheral engagement with said disk wheel and operatively connected to said cam for rotating the same, movable support means on said frame connected to said gauge means to permit of its elevation relative to the thickness of material moving on said conveyor belt, means on said frame for supporting said cam, and as the vertical position of said gauge wheel varies with the thickness of material moving on said conveyor belt, the contact point on said disk wheel with said drive wheel becomes progressively radially spaced from the axis thereof to progressively increase the spread of rotation of said drive wheel and cam and to correspondingly increase the actuations of said counter.

8. A device as defined in claim 7 where said drive wheel is in register with the axis of said disk wheel when no material is moving on said conveyor belt and in which position said drive wheel and said cam are inoperable.

9. In a metering device for silage, grain and the like, the combination of:

an even surface conveyor means, a motor for operating said conveyor means, a counter device connected to said motor for deactuating the same after a predetermined number of actuations of said counter device, a gauge means disposed over said conveyor means, movable support means for said gauge means to permit of its elevation relative to the thickness of material moving on said conveyor means, said gauge means including a disk wheel rotatable by said motor, a rotatable cam engagable with said counter device to intermittently actuate the same, a drive wheel in peripheral engagement with said disk wheel and operatively connected to said cam for rotating the same, and as the vertical position of said gauge means varies with the thickness of material moving on said conveyor means, the contact point on said disk wheel with said drive wheel become progressively radially spaced from the axis thereof to progressively increase the speed of rotation of said drive wheel and cam and to correspondingly increase the actuations of said counter device.

References Cited by the Examiner
UNITED STATES PATENTS

| 857,742 | 6/1907 | Lanquist. | |
|---|---|---|---|
| 1,773,816 | 8/1930 | Lea. | |
| 2,848,097 | 8/1958 | Saxe | 198—39 |
| 3,115,275 | 12/1963 | Hynd | 222—20 |

References Cited by the Applicant
UNITED STATES PATENTS

| 402,820 | 5/1889 | Gottfried. |
|---|---|---|
| 1,151,956 | 8/1915 | Lea. |
| 1,249,060 | 12/1917 | Fullerton. |
| 1,250,764 | 12/1917 | Baker. |
| 1,647,704 | 11/1927 | Lea. |
| 2,312,216 | 2/1943 | Keeler. |
| 2,430,935 | 11/1947 | Klug. |
| 2,690,833 | 10/1954 | Peterson. |
| 2,985,277 | 5/1961 | Prellwitz. |
| 3,059,566 | 10/1962 | Grau. |

EVON C. BLUNK, *Primary Examiner.*

RICHARD E. AEGERTER, *Examiner.*